US005672948A

United States Patent [19]
Cohen et al.

[11] Patent Number: 5,672,948
[45] Date of Patent: Sep. 30, 1997

[54] DIGITAL, BACK EMF, SINGLE COIL SAMPLING, SENSORLESS COMMUTATOR SYSTEM FOR A D.C. MOTOR

[75] Inventors: Adam J. Cohen, Worcester; Roger L. Holman, Acton, both of Mass.; Rajesh M. Nair, Nashua, N.H.

[73] Assignee: Cambridge Aeroflo, Inc., Shirley, Mass.

[21] Appl. No.: 339,827

[22] Filed: Nov. 15, 1994

Related U.S. Application Data

[63] Continuation-in-part of Ser. No. 76,383, Jun. 14, 1993, abandoned.
[51] Int. Cl.[6] .................................................. H02P 1/18
[52] U.S. Cl. .......................... 318/603; 318/254; 318/439; 388/816; 388/928.1
[58] Field of Search ............................. 318/254, 439, 318/603, 138; 388/805, 812, 813, 816, 820, 928.1

[56] References Cited

U.S. PATENT DOCUMENTS 5,306,988  4/1994  Carobolante ........................ 318/254

*Primary Examiner*—Brian Sircus
*Attorney, Agent, or Firm*—Iandiorio & Teska

[57] ABSTRACT

A digital, back EMF, single coil, sensorless up/down counter frequency adjustment system for a d.c. motor includes means for detecting the occurrence of a null voltage during the back EMF commutation state of a field coil; counter means for counting in one direction during the back EMF commutation state and for counting in the opposite direction when the null voltage is detected; means, responsive to the counter means, for ascertaining the final count of the counter means; and means, responsive to the means for ascertaining, for adjusting the frequency of initiation of the commutation states when a non-zero count is ascertained for synchronizing the field coil and the rotor.

1 Claim, 7 Drawing Sheets

DIGITAL, BACK EMF, SINGLE COIL SAMPLING, SENSORLESS COMMUTATOR SYSTEM FOR A D.C. MOTOR

RELATED CASE

This application is a continuation-in-part of U.S. patent application Ser. No. 08/076,383, filed Jun. 14, 1993, now abandoned entitled "Digital, Back EMF, Single Coil Sampling, Sensorless Commutator System for a D.C. Motor, by Adam J. Cohen, Roger L. Holman, and Rajesh M. Nair which is incorporated by reference herein in its entirety.

FIELD OF THE INVENTION

This invention relates to a digital, back EMF, sensorless commutator for a d.c. motor which utilizes a counter to obtain a count which provides synchronization feedback information.

BACKGROUND OF INVENTION

Historically, d.c. motors used mechanical brushes and commutators to control the progress of the magnetic field about the field coils to drive the rotor. Subsequently Hall effect sensors were used to sense the magnetic field and operate relays or solid state switches to sequentially energize and de-energize the field coils. While this eliminated the mechanical brushes and commutators and the attendant problems, it required the incorporation in the motor of a circuit board with five wire access. More recently the Hall effect approach has been replaced with techniques that rely on the back EMF generated in each field coil while each coil is deenergized to determine the proper switching point for each coil. One such technique monitors the null or zero point of the motor and sequentially integrates the difference between the null point and the back EMF from each coil and provides the output of that integration to a voltage controlled oscillator (VCO). If there is a difference the VCO has its frequency increased or decreased to stay in phase with the present commutator frequency in the manner of a phased locked loop. Typically this system includes a microprocessor and complex analog and digital circuits which include, among other things, analog switches, op-amps, oscillators, combinatorial logic, one-shots, and digital command interfaces. This combined analog and digital system creates additional problems during the start-up sequence which is a common, primary problem associated with the sensorless approach. This system addresses that problem in a three mode sequence. In a first mode it disconnects the VCO and sets switches directly to align the rotor. In a second mode it disconnects the comparator/integrator and connects a current generator to charge a capacitor and ramp-up the VCO to gradually increase its frequency and the commutator speed at starting. In the third mode it disconnects the current source and reconnects the comparator/integrator to begin normal operation of the motor once it has attained sufficient speed to provide a usable signal to the comparator. The microprocessor also performs a number of other functions including introducing external speed control commands to the system. Although this technique eliminates the need for the Hall effect sensors, a circuit board in the motor and the need for five wire access, it has a number of shortcomings: the variation in frequency output of the VCO with respect to voltage input is sensitive to temperature and varies from chip to chip which results in poor ramp-up control; the response to changes in torque is relatively slow due to the slow ramp-up achievable with the high time-constant capacitor which is required; the multiplexing and analog processing sequence to resolve signals from all three coils sequentially is cumbersome and complex; the feedback circuit including the ramp-up capacitor must be tailored to the particular load. Further, the microprocessor is not intimately involved in the control loop and so the locked condition, rotor position and ramp-up rate are difficult to monitor and control, and most of the control parameters are fixed in hardware, making adaptive control impossible.

Another approach taken, which is described in the parent application to the present application, U.S. patent application Ser. No. 08/076,383 referred to above, detects the time of the occurrence of the null voltage during the back EMF period of a single field coil. The time of the detected back EMF null voltage is then compared to the time of an expected null voltage corresponding to the present commutation speed. The commutation speed is adjusted in response to a difference between the times of the expected back EMF null voltage and the detected back EMF null voltage to synchronize the field of the coil and the motor. While this approach has proven effective it does have certain drawbacks. It is susceptible to noise in the system which could result in an inaccurate zero crossing time reading. An accurate zero crossing reading is necessary as this reading is compared to an expected zero crossing time in order to properly adjust the commutation speed. Moreover, the expected zero crossing times for various commutation speeds must be stored in the system's microprocessor, indexed and retrieved each time a comparison must be made. Also, a complex algorithm must be stored in and executed by the microprocessor each time a comparison of actual and expected zero crossing times must be made.

SUMMARY OF INVENTION

It is therefore an object of this invention to provide an improved digital, back EMF, sensorless, frequency adjustment commutator system.

It is a further object of this invention to provide such an improved digital, back EMF, sensorless, frequency adjustment commutator system which uses a simple up/down counter approach to time commutation.

It is a further object of this invention to provide such an improved digital, back EMF, sensorless, frequency adjustment commutator system which is less susceptible to the deleterious effects of system noise since it does not rely on a singular element such as a zero crossing to make the adjustment.

It is a further object of this invention to provide such an improved digital, back EMF, sensorless frequency adjustment commutator system which employs digital instead of analog commutator control.

It is a further object of this invention to provide such an improved digital, back EMF, sensorless frequency adjustment commutator system which employs a single microprocessor to perform commutation control as well as the overall control of the motor, e.g., speed control.

It is a further object of this invention to provide such an improved digital, back EMF, sensorless frequency adjustment commutator system which requires a less complex software implementation in the microprocessor.

It is a further object of this invention to provide such an improved digital, back EMF, sensorless, frequency adjustment commutator system which requires less memory storage area and execution time.

It is a further object of this invention to provide such an improved digital, back EMF, sensorless frequency adjustment commutator system which is more reliable, less sensitive to temperature and component tolerances, and is less expensive.

It is a further object of this invention to provide such an improved digital, back EMF, sensorless frequency adjustment commutator system which inherently provides much greater knowledge and control of the entire motor system.

This invention results from the realization that a truly effective improved digital, back EMF, single coil sampling, sensorless commutator system for a d.c. motor can be achieved by counting in one direction during the back EMF commutation state until the null voltage occurs and counting in the opposite direction thereafter during the back EMF commutation state and ascertaining the final count in order to adjust the frequency of initiation of the commutation states when a non-zero count is ascertained for synchronizing the field coil and the rotor.

This invention features a digital, back EMF, single coil sampling, sensorless commutator system for a d.c. motor with up/down counter frequency adjustment. The system includes means for detecting the occurrence of a null voltage during the back EMF commutation state of a field coil. There are counter means for counting in one direction during the back EMF commutation state until the null voltage occurs and for counting in the opposite direction thereafter during the back EMF commutation state. There are also means, responsive to the counter means, for ascertaining the final count of the counter means responsive to the means for ascertaining, for adjusting the frequency of initiation of the commutation states when a non-zero count is ascertained for synchronizing the field coil and the rotor.

In a preferred embodiment the counter means may continue to count in the opposite direction during the back EMF commutation state after the null voltage is detected until a back EMF flyback voltage occurs. The means for adjusting may include means for increasing the initiation frequency of the commutation states when a negative final count is ascertained indicating a lagging field coil and for decreasing the initiation frequency of the commutation states when a positive final count is ascertained indicating a leading field coil voltage.

This invention further features a digital, back EMF, single coil sampling, sensorless commutator system for a d.c. motor with up/down counter frequency adjustment. The system includes counter means for counting in a first direction while there is a negative voltage on a field coil and for counting in a second direction while there is a positive voltage on the field coil during the first back EMF commutation state and for counting in the first direction while there is a positive voltage on the field coil and for counting in the second direction while there is a negative voltage on the field coil during the second back EMF commutation state. There are means, responsive to the counter means, for ascertaining the final count of the counter means. There are also means, responsive to the means for ascertaining, for adjusting the initiation frequency of the commutation states when a non-zero count is ascertained for synchronizing the field coil and the rotor.

In a preferred embodiment the counter means, during the second back EMF commutation state, may continue to count in the first direction while a negative voltage is on the field coil and in the second direction while a positive voltage is on the field coil until after a back EMF flyback voltage occurs. The means for adjusting may include means for increasing the initiation frequency of the commutation states when a negative final count is ascertained indicating a lagging field coil voltage and for decreasing the initiation frequency of the commutations states when a positive final count is ascertained indicating a leading field coil voltage.

DISCLOSURE OF PREFERRED EMBODIMENT

Other objects, features and advantages will occur to those skilled in the art from the following description of a preferred embodiment and the accompanying drawings, in which.

Figure 1:
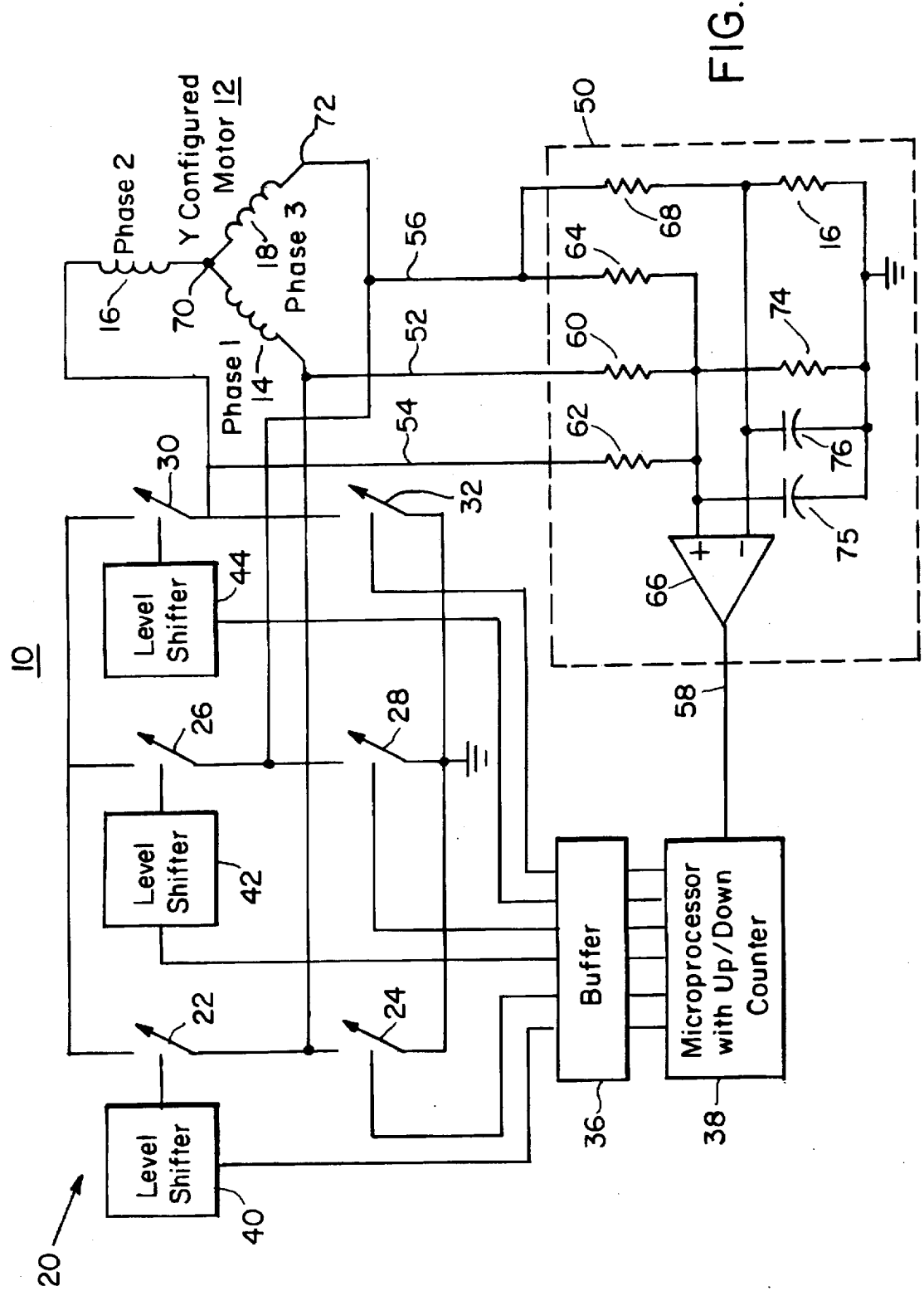
FIG. 1 is a block diagram with parts shown in schematic of a digital, back EMF, sensorless, single coil sampling, commutator system for a d.c. motor with up/down counter frequency adjustment according to this invention.

There is shown in FIG. 1 a digital, back EMF, single coil sampling, sensorless commutator system with up/down counter frequency adjustment 10 for a d.c. motor 12 which includes three field coil windings, Phase 1, 14, Phase 2, 16, and Phase 3, 18. D.C. motor 12 is commutated by means of power commutating switch circuit 20 which includes six switches 22, 24, 26, 28, 30 and 32, operated by buffer 36. Buffer 36 responds to microprocessor 38 to provide switching commands at the proper voltage level to operate switches 22–32. Switches 24, 28 and 32 are connected to ground but switches 22, 26 and 30 can be considerably above ground, and so additional voltage level shifters 40, 42 and 44 are used to provide the proper voltage levels to those switches, all as is well known in the art. Zero or neutral crossing detector circuit 50 responds to the voltages on field coils 14, 16 and 18 on lines 52, 54 and 56 to provide an output on line 58, whenever a single one of the coils, in this particular case coil 18, is at its null point in its back EMF generation.

Figure 2:
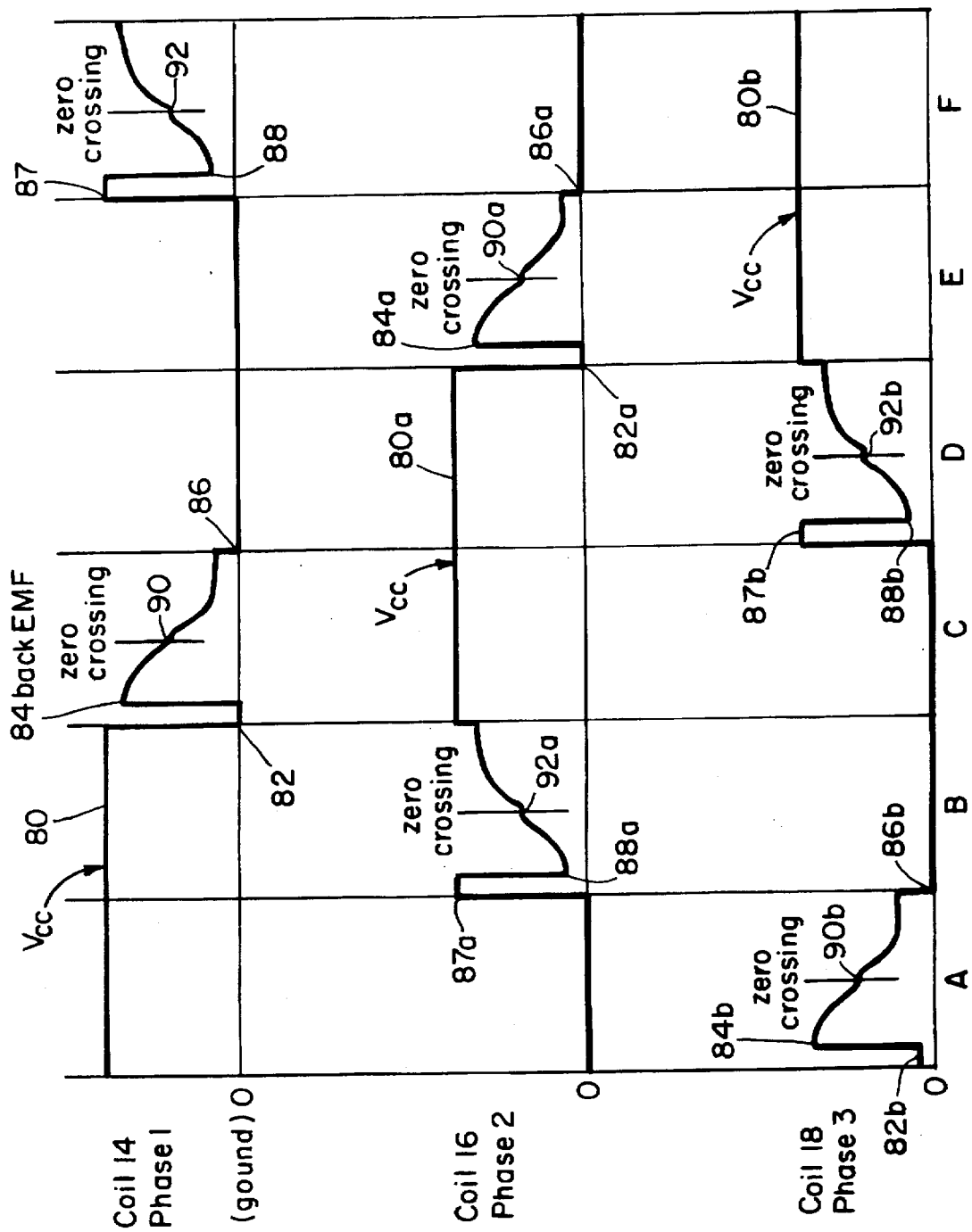
FIG. 2 shows the waveforms in each of three coils in the motor of FIG. 1.

Zero or neutral detector circuit 50 includes three resistors 60, 62 and 64 which are connected, respectively, at one end through lines 52, 54 and 56 to coils 14, 16 and 18, and at their other end are connected together to provide one input to the positive terminal of comparator 66. The negative terminal of comparator 66 receives its input from one end of resistor 68 whose other end is connected through line 56 to coil 18. Thus the output from the three resistors 60, 62 and 64 define the voltage at the center 70 of the Y connected coils 14, 16 and 18. The resistor 68 provides the voltage at the other end 72 of the selected coil 18. When coil 18 has the same voltage at both ends, point 70 and point 72, there will be no output on line 58 from comparator 66. Resistors 74 and 76 are employed to implement voltage dividers so that the inputs to the positive and negative terminals of comparator 66 are the proper voltage level. There are also capacitors 75 and 77 for filtering out pulse width modulation noise during speed control which are connected respectively between the positive terminal of comparator 66 and ground and the negative terminal of comparator 66 and ground. Microprocessor 38 includes up/down counter which counts up and/or down during the two back EMF commutation states and obtains a final count at the end of the second back EMF commutation state. The up/down counter consists of a microprocessor subroutine that polls to the output of comparator 66. From the final count microprocessor 38 determines whether the commutation speed should be increased or decreased in order to maintain the synchronization between the field progression and the rotor. The voltages of each of the coils, coil 14, Phase 1, coil 16, Phase 2, coil 18, Phase 3, are shown in FIG. 2 during the six commutation states A, B, C, D, E and F. Coil 14 is at full supply voltage $V_{cc}$ at 80 in states A and B and then when switched by power commutation switching circuit 20 drops to below zero at 82, under control of the power commutating switching circuit 20. Shortly after point 82 the field collapses and the back EMF is established at 84 and gradually decreases during state C until power commutating switch circuit 20 drops it directly to zero at point 86. During states D and E coil 14 remains at ground, point 86, and then at the beginning of state F the full voltage $V_{cc}$ is clamped at level 87. A short time after that the field collapses and the back EMF 88 begins a gradual increase until the end of state F, where the system returns to state A. Since switches 22–32 are semiconductor devices and are accompanied by back diodes as known in the art, levels 82 and 87 are actually approximately one diode drop or 0.7 volt beyond the level shown.

The zero crossing points in states C and F are shown at points 90 and 92. These are the points, as indicated before, at which the two ends of the momentarily unenergized one of the three coils are at the same voltages. Each of the coils goes through the same cycle but 120° out of phase, so that coil 16 follows the same pattern but shifted by two states as coil 14, and coil 18 follows the same pattern as coil 14 but shifted four states. It is coil 18, Phase 3, that is actually used for the control circuit.

Figure 3A:
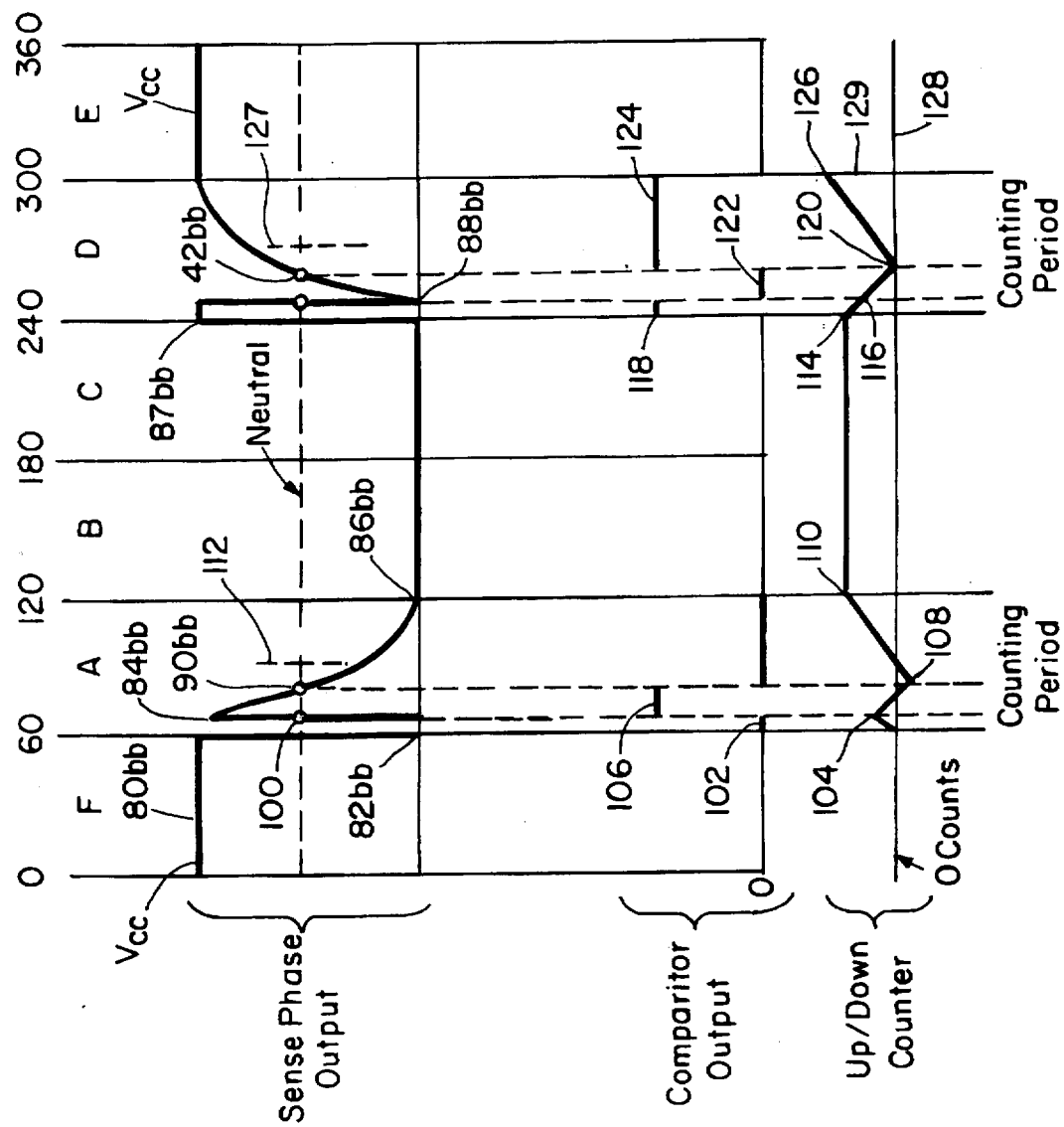
FIG. 3A shows a leading voltage waveform of coil 18 of FIG. 2, the corresponding comparator output and the up/down counter output over the six commutation states.
Figure 3B:
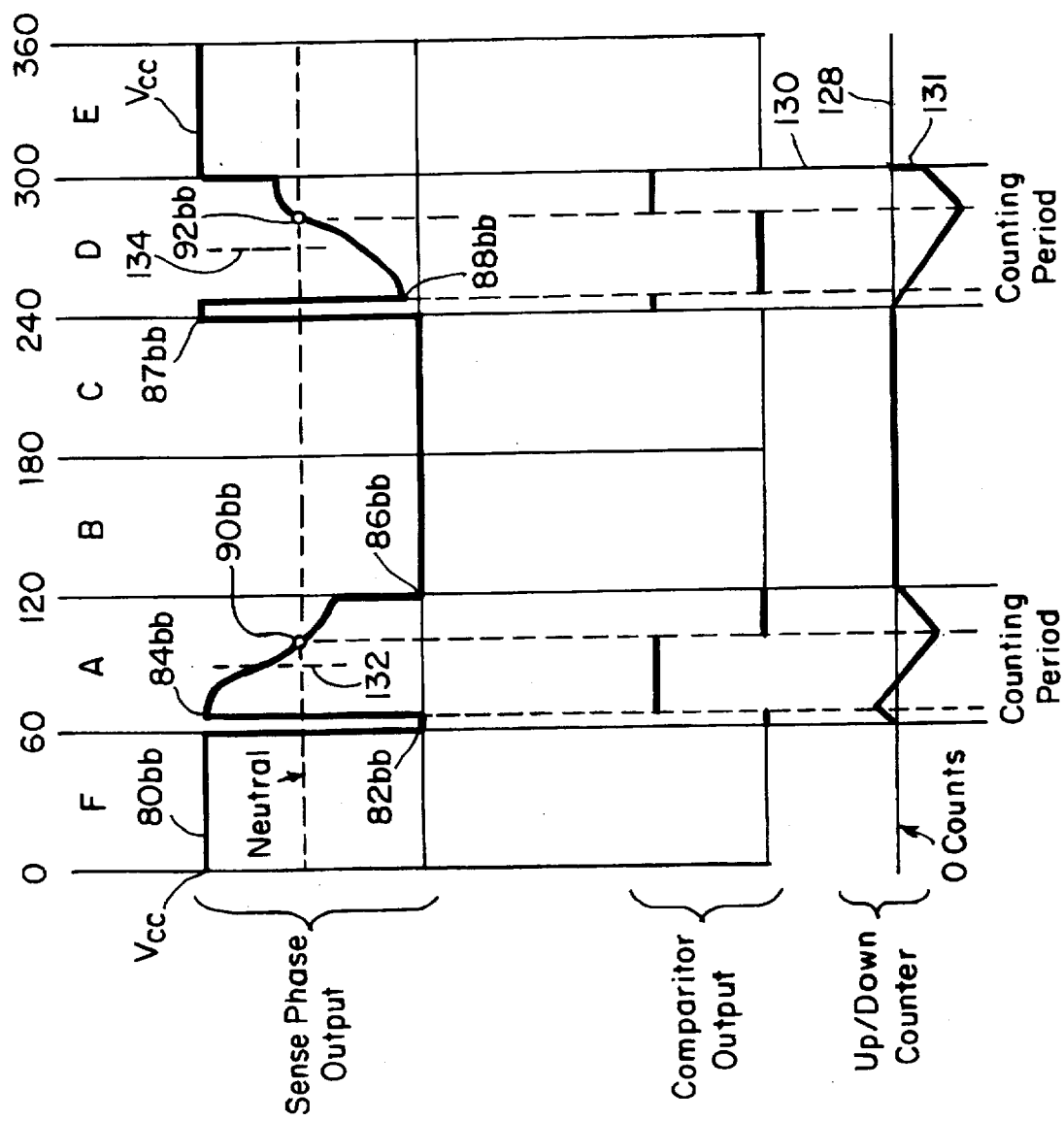
FIG. 3B shows a lagging voltage waveform of coil 18 of FIG. 2, the corresponding comparator output and the up/down counter output over the six commutation states.
Figure 3C:
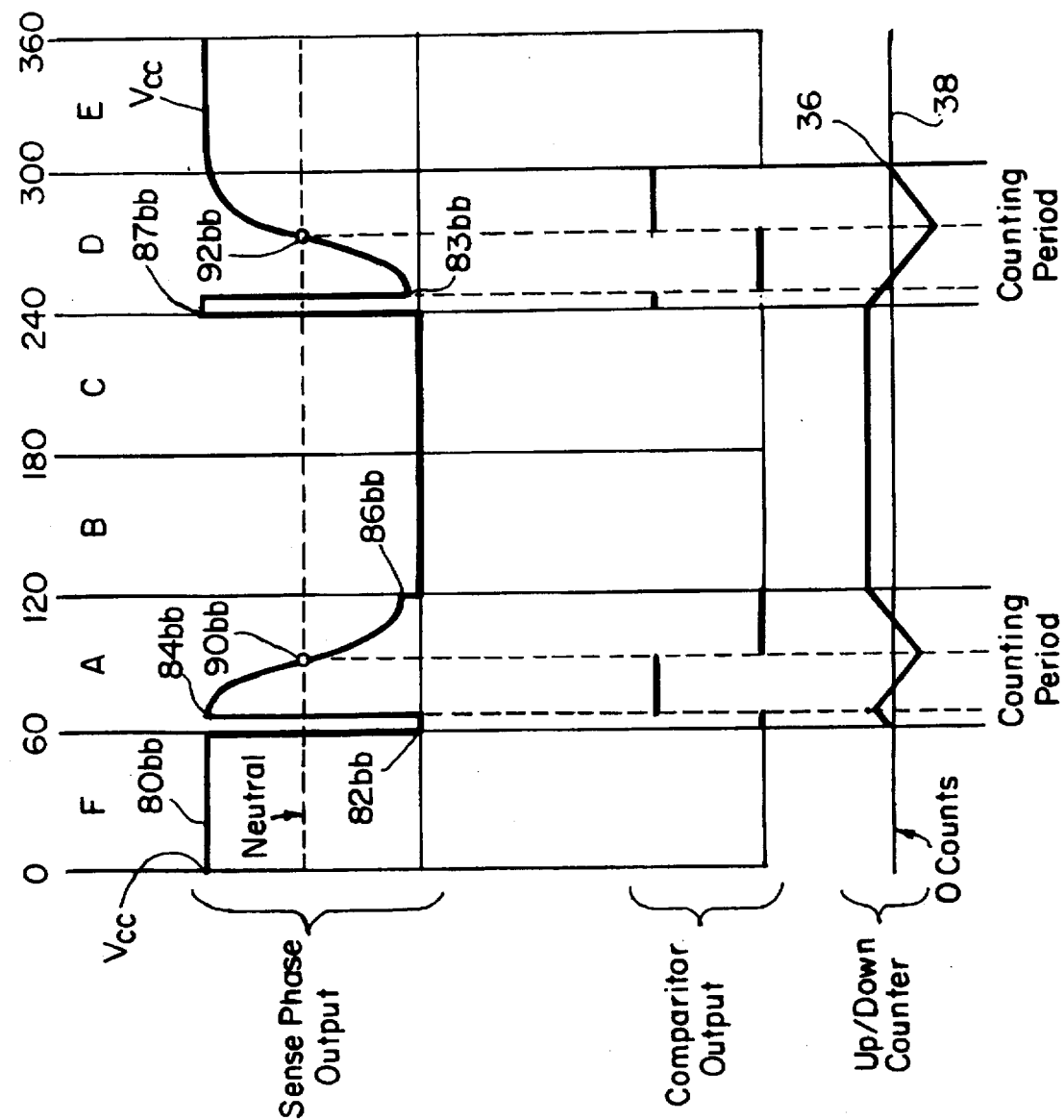
FIG. 3C shows an in phase voltage waveform of coil 18 of FIG. 2, the corresponding comparator output and the up/down counter output over the six commutation states.

The operation of up/down counter of microprocessor 38 FIG. 1, as it relates to the voltage waveform of coil 18 and the output of comparator 66, FIG. 1 is shown in FIGS. 3A–C. In each of these figures the voltage waveform on coil 18 is shown in each of the six commutation states, A through F, which depicts one full cycle of rotor rotation. The back EMF commutation states, which are the states where the neutral or zero crossing of the waveform occurs, are states A and D. In back EMF commutation state A the up/down counter counts up while the voltage on coil 18 is below the neutral or zero crossing indicated by a zero comparator output and down while the voltage is above the neutral or zero crossing indicated by a one or high comparator output. In commutation state D the up/down counter operates in the opposite manner, counting up for a voltage above the neutral or zero crossing and down for a voltage below the neutral or zero crossing.

The voltage on coil 18 over the six commutation states A through F is shown in FIG. 3A. Throughout commutation state F coil 18 is at full supply voltage $V_{cc}$ at 80 bb until commutation switching circuit 20 releases the coil which causes the voltage to drop to zero at 82 bb as the magnetic field collapses. Shortly after point 82 bb, now in commutation state A, the field collapses and the back EMF is established at 84 bb. Between points 82 bb and the neutral or zero crossing 100 the output 102 of comparator 66, FIG. 1, is zero as the voltage on coil 18 is below the neutral or zero crossing. The up/down counter counts up until it reaches point 104 which corresponds to the occurrence of the neutral or zero crossing at 100. Between the neutral or zero crossing at 100 and the neutral or zero crossing at 90 bb of the coil 18 waveform the comparator output 106 is a one or high because the voltage on coil 18 is above the neutral or zero crossing. The up/down counter accordingly counts down to point 108 on the up/down counter waveform until the coil voltage falls below the neutral or zero crossing after point 90 bb. Then, the up/down counter progressively counts upward again between points 90 bb and 86 bb until it reaches point 110 on the up/down counter waveform where the count levels off at zero through commutation states B and C since the counter does not count during states F,D,C and E, It can be seen that the coil voltage waveform is leading as the neutral or zero crossing 90 bb occurs before the middle of commutation state A depicted by dashed line 112.

When the second back EMF commutation state D occurs the up/down counter again begins to count. However, in this second back EMF period, the counter counts in the opposite direction, that is, it counts down for a zero comparator output indicating a negative voltage on coil 18 and it counts up for a one or high comparator output indicating a positive voltage output on coil 18. This inverse counting begins only after the flyback voltage indicated at 87 bb occurs. Otherwise the two flyback pulses would count in the same direction rather than cancel each other by counting in opposite directions, which is what is desired. This would obscure the important information contained in the voltage signal caused by the back EMF. Thus, between points 114 and 116 on the up/down counter waveform the counter is counting down because there is a one or high comparator output 118 due to the positive voltage on coil 18 resulting from the flyback voltage 87 bb. This counting procedure is identical to the counting procedure of back EMF commutation state A. After point 116, however, the counting process is inverted. Thus, between points 116 and 120 on the up/down counter waveform, there is a down count occurring as a result of the zero comparator output 122 caused by voltage on coil 18 between waveform points 88 bb and 92 bb below the neutral or zero crossing. Between points 120 and 126 on the up/down counter waveform the count is increasing because of a one or high comparator output 124 caused by the voltage above the neutral or zero crossing on coil 18 between points 92 bb and the end of commutation state D where coil 18 levels off at the full supply voltage $V_{cc}$. As can be seen also in commutation state D the voltage on coil 18 is leading as there is a neutral or zero crossing at 92 bb before the center of back EMF commutation state D indicated by dashed line 126. Because the voltage on coil 18 is leading, the final count of the up/down counter ends in a high position above the zero line 128 resulting in a positive final count 129. This positive final count 129 is used to decrease the frequency of initiation of the commutation states to eliminate the leading voltage to better align the field coil voltage and the rotor so that the neutral or zero crossing occurs at the center of the back EMF commutation states A and D at the dashed lines 112 and 136, respectively.

In FIG. 3B the same process occurs. However, in this figure the final count 130 terminates below zero line 128 resulting in a negative final count 131 indicating a lagging voltage in coil 18. The lagging voltage can be seen in back EMF commutator state A where neutral or zero crossing 90 bb occurs after the center of back EMF commutation state A indicated by dashed line 132. Neutral or zero crossing 92 bb in back EMF commutation state D is also shown to occur after the center of the commutation state indicated at dashed line 134. The negative final count information 131 is used by microprocessor 38 to increase the frequency of initiation of the commutation states in order to eliminate the lagging voltage and better align the field coil voltage and the rotor so that the neutral or zero crossing occurs at the center of the back EMF commutation states A and D at dashed lines 132 and 134, respectively.

The desired condition is shown in FIG. 3C where final count 136 coincides with zero line 128 indicating that the voltage in coil 18 crosses the neutral or zero crossing at the center of back EMF commutation states A and D.

Figure 4:
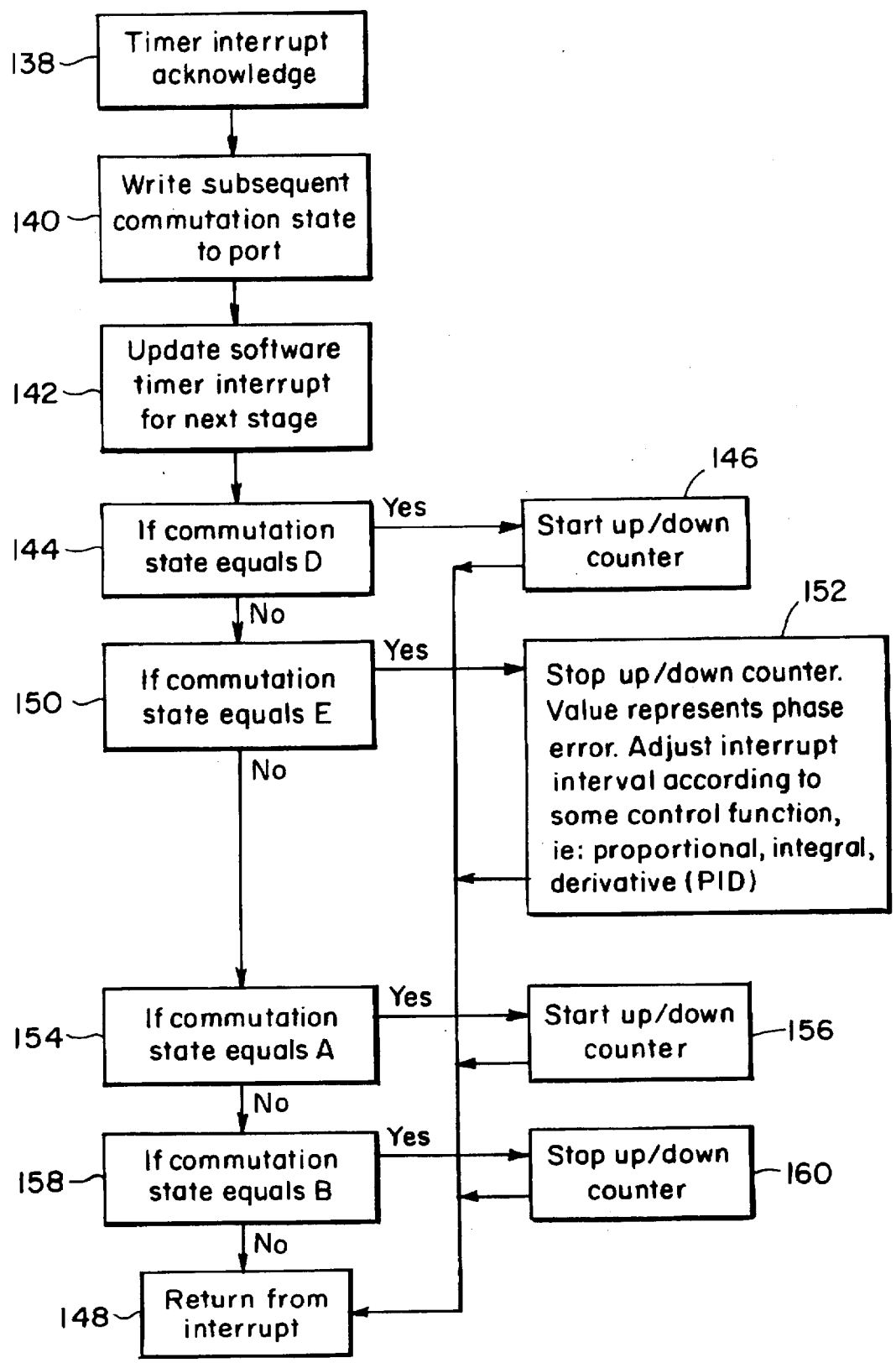
FIG. 4 is a flow chart showing the operation of the microprocessor which digitally servo controls the frequency of initiation of the various commutation states of the motor in FIG. 1.

The operation of microprocessor 38 is depicted in the flow chart of FIG. 4. Operation begins with a time interrupting acknowledge 138 which interrupts the other operations of microprocessor 38 and which increments the present commutation state (A–F) in step 140 and writes the next commutation state to buffer 36, FIG. 1. That is, the buffer is supplied with the appropriate switching information to supply to the switches of commutator 20 (FIG. 1) corresponding to the switching configuration necessary for the next communication state. In step 142 the microprocessor is updated as to the time when the next timer interrupt is to take place. The system then determines whether the present commutation state is state D in step 144 which is the second back EMF commutation state of coil 18. If it is in state D, then in step 146 the up/down counter of microprocessor 38 starts to count as described with regard to FIGS. 3A–C. That is, the comparator is continuously polled and while its output is one or high the counter is continuously incremented, and if the comparator output is zero the counter is continuously decremented. In this second back EMF commutation state, however, as described above, the counter is not incremented when a comparator output of one is found (nor is the comparator decremented when a zero comparator output is found) until after the back EMF flyback voltage occurs. During the back EMF flyback voltage the counter is decremented with a comparator output of one and incremented with a comparator output of zero as is the case in back EMF commutation state A.

Microprocessor 38 then exits through the return from interrupt step 148. If the response in step 144 is that the commutation state is not D, then the question is asked in step 150 as to whether the commutation state is E, the immediately following state. If it is then in step 152 the up/down counter is stopped and the value of the final count which represents the phase error is determined. That is, as described above, if there is a positive final count this indicates that the voltage in the field coil leads the rotor and if a negative final count is determined then this indicates that a lagging field coil voltage is found. Thus, the frequency of initiation of the commutation states is accordingly adjusted according to a control function such as a proportional, integral derivative (PID), as described below with regard to FIG. 5. Microprocessor 38 then exits through the return from interrupt step 148. If the response in step 150 is that the commutation state is not E, then the question is asked in step 154 as to whether the commutation state is A. If it is then in step 156 the up/down counter is started. The comparator is continuously polled and if a one or high count is found the counter is decremented and if a zero count is found the counter is incremented. At the end of this commutation state the microprocessor 38 exits through return from interrupt 148. If the response is step 154 is that the commutation state is not A, then the question is asked in step 158 if the commutation state is B and if it is not, at step 148 the microprocessor returns from interrupt. If it is commutation state B the up/down counter is stopped at step 160 and then the microprocessor returns from interrupt at step 148.

Figure 5:
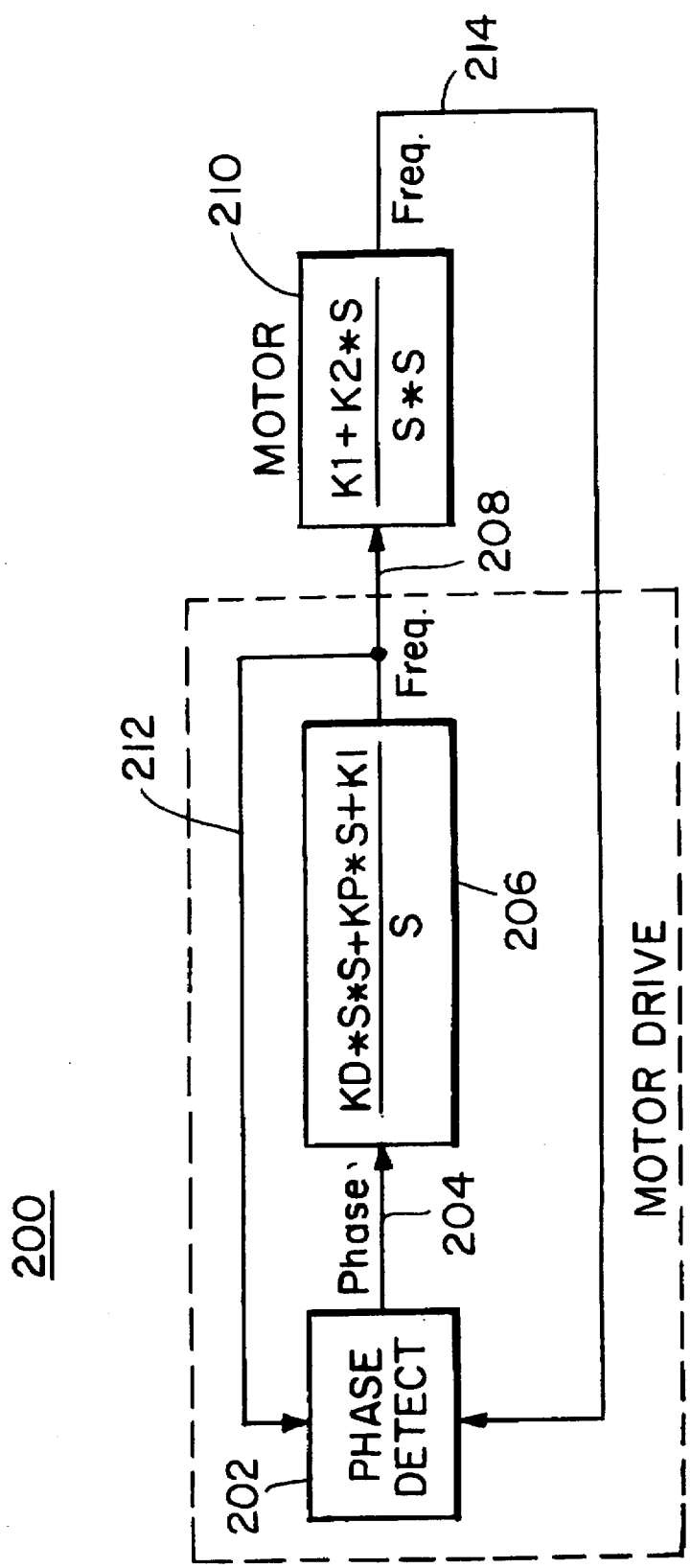
FIG. 5 is a functional block diagram of the digital phase lock loop and servo feedback loop implemented in the microprocessor according to this invention.

In FIG. 5, them is shown the phase lock loop and servo feedback loop 200. The loop includes certain transfer functions which include constants K, K1 and K2 and a laplace transfer variable S. Laplace transform variable S equals $\delta+j\omega$, where $\delta$ is a real number, j is an imaginary number ($\sqrt{-1}$) and $\omega$ equals $2\pi \times$ frequency. Phase detect block 202 performs the counting function during both back EMF commutation states, for example, with regard to coil 18, during back EMF commutation states A and D. A final count representing the phase is output on line 204 to control function 206, which may be a PID (proportional integral differential control function) or some other similar control function. The final count or phase information on line 204 is essentially used to adjust the initiation frequency of the commutation states. For example, the commutation states (A–F) may change with an initial frequency of 1000 counts of the microprocessor clock between each state. However, if a final count of the up/down counter is greater than zero then this indicates that there is a leading voltage on the coil and the initial count of 1000 is increased such that the time between commutation state switches will be longer in order to put the neutral or zero crossing of the field coil and the rotor in sync. In the same respect, if a negative final count is detected then the frequency of initiation of the commutation states is increased by lowering the initial count from 1000 to a lower number so that the lagging coil voltage will speed up to match the rotor field voltage. This frequency or counter adjustment is output on line 208 to motor 210 where the frequency of commutation is adjusted accordingly. The frequency output on line 208 is also fed back to phase detect 202 on line 212. And, the frequency of the motor is fed back to phase detect 202 on line 214.

Although specific features of this invention are shown in some drawings and not others, this is for convenience only as each feature may be combined with any or all of the other features in accordance with the invention.

Other embodiments will occur to those skilled in the art and are within the following claims:

What is claimed is:

1. A digital, back EMF, sensorless commutation system for a d.c. motor comprising:

means for detecting the occurrence of a null voltage during high impedance states of a field coil of the d.c. motor;

counter means for counting in a first direction in a first high impedance state during voltages below the null voltage and for counting in a second direction during voltages above the null voltage;

means for counting in the second direction at a beginning of a second high impedance state until the first occurrence of a null voltage and for thereafter counting in said second direction during voltages below the null voltage and for counting in said first direction during voltages above the null voltage;

means, responsive to said counter means for ascertaining the final count of said counter means; and means, responsive to said means for ascertaining, for adjusting the frequency of initiating of the commutation states for synchronizing said d.c. motor.

* * * * *